United States Patent
Curti et al.

(10) Patent No.: US 9,214,841 B2
(45) Date of Patent: Dec. 15, 2015

(54) AIRCRAFT POWER GENERATING ASSEMBLY

(75) Inventors: Edoardo Curti, Chieri (IT); Ivan Borra, Savigliano (IT); Marco Cipriani, Turin (IT)

(73) Assignee: GE AVIO S.p.A. (IT)

( * ) Notice: Subject to any disclaimer, the term of this patent is extended or adjusted under 35 U.S.C. 154(b) by 111 days.

(21) Appl. No.: 13/368,655

(22) Filed: Feb. 8, 2012

(65) Prior Publication Data
US 2013/0038180 A1    Feb. 14, 2013

(30) Foreign Application Priority Data

Feb. 8, 2011    (IT) .............................. TO2011A0105

(51) Int. Cl.
| | | |
|---|---|---|
| *H02K 7/10* | (2006.01) | |
| *H02K 7/116* | (2006.01) | |
| *F01D 15/10* | (2006.01) | |
| *F02C 7/268* | (2006.01) | |
| *F02C 7/32* | (2006.01) | |
| *H02K 1/30* | (2006.01) | |
| *H02K 7/18* | (2006.01) | |
| *H02K 16/04* | (2006.01) | |

(52) U.S. Cl.
CPC .............. *H02K 7/1163* (2013.01); *F01D 15/10* (2013.01); *F02C 7/268* (2013.01); *F02C 7/32* (2013.01); *H02K 1/30* (2013.01); *F05D 2220/50* (2013.01); *H02K 7/1815* (2013.01); *H02K 7/1823* (2013.01); *H02K 16/04* (2013.01); *Y02T 50/671* (2013.01)

(58) Field of Classification Search
CPC .............. F02D 11/00; H02K 1/00; H02P 1/00
USPC .. 290/1 A, 1 C, 4 A, 4 C, 4 D, 4 R; 310/67 R
See application file for complete search history.

(56) References Cited

U.S. PATENT DOCUMENTS

| | | | | |
|---|---|---|---|---|
| 5,532,535 | A | * | 7/1996 | Oltmanns ........................ 310/90 |
| 5,631,511 | A | * | 5/1997 | Schulmann ............. C30B 15/30 |
| | | | | 117/13 |
| 6,259,166 | B1 | | 7/2001 | Tommer |
| 7,543,439 | B2 | * | 6/2009 | Butt et al. .................. 60/39.183 |
| 2007/0101714 | A1 | * | 5/2007 | Duesmann et al. ............. 60/598 |
| 2010/0327589 | A1 | | 12/2010 | Macchia |

FOREIGN PATENT DOCUMENTS

EP    1640607    3/2006

OTHER PUBLICATIONS

IT Appln. No. TO2011A 000105—Dec. 9, 2011 Italian Search Report.

* cited by examiner

*Primary Examiner* — Tulsidas C Patel
*Assistant Examiner* — Thomas Quigley
(74) *Attorney, Agent, or Firm* — Davidson Berquist Jackson & Gowdey LLP

(57) ABSTRACT

An aircraft power generating assembly having a mechanical gear transmission, and an electric machine integrated in the mechanical transmission; the electric machine having a stator connected directly to a fixed frame of the mechanical transmission, and a rotor surrounding and rotated by a rotary shaft of the mechanical transmission; and the opposite ends of the rotary shaft being connected to respective further rotary input/output shafts.

18 Claims, 4 Drawing Sheets

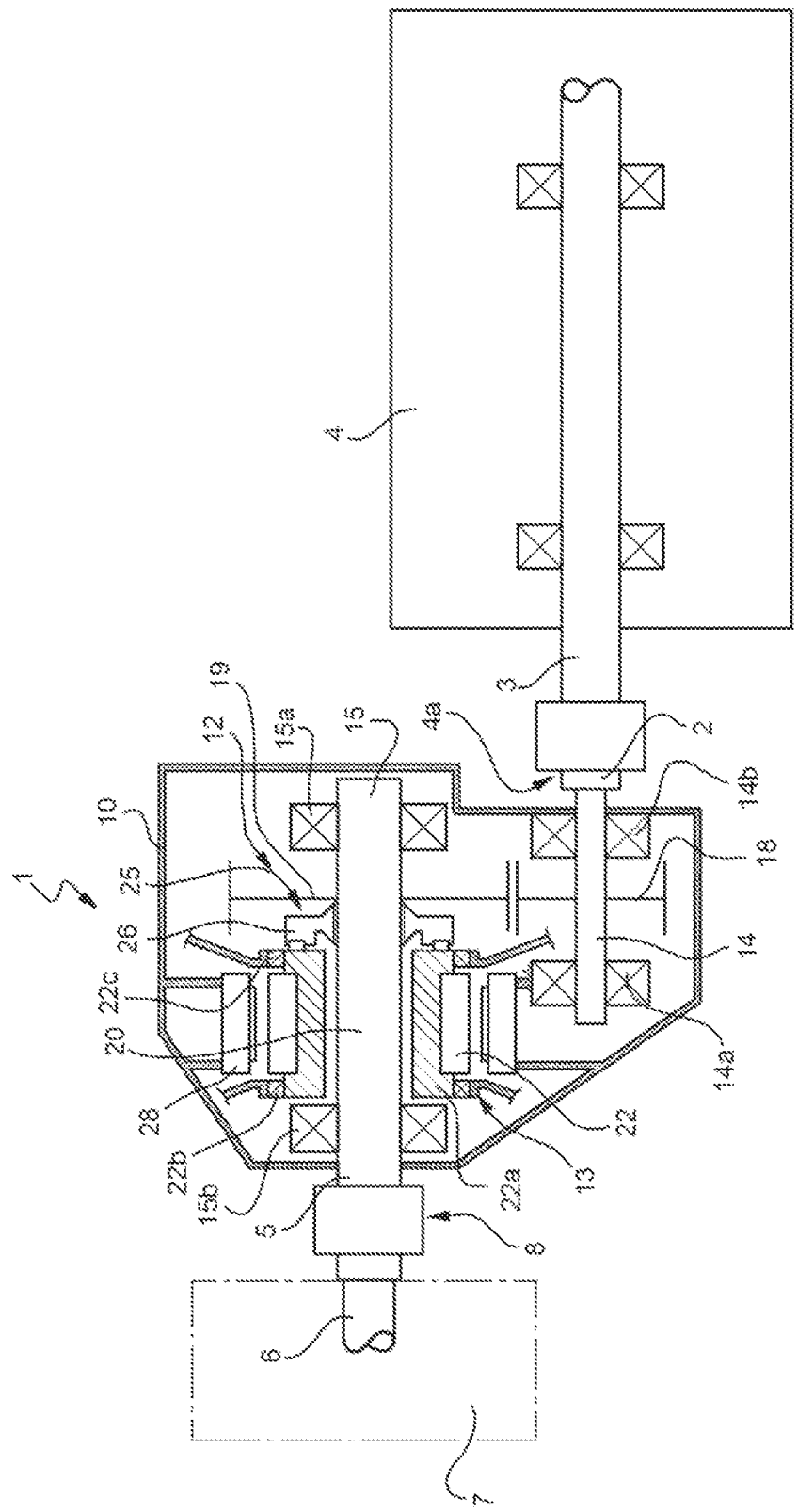

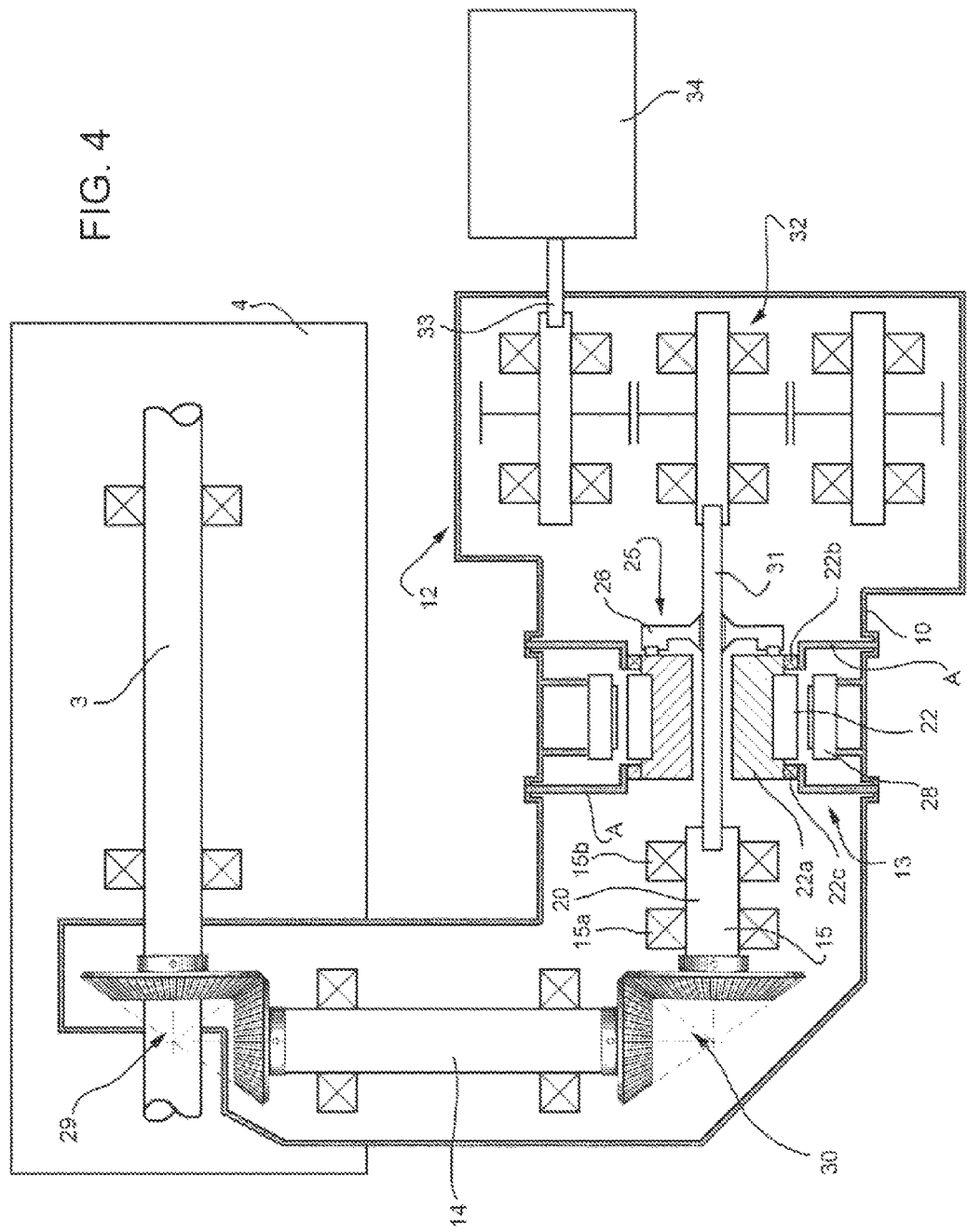

AIRCRAFT POWER GENERATING ASSEMBLY

The present invention relates to an aircraft power generating assembly.

BACKGROUND OF THE INVENTION

As is known, aircraft in general must be guaranteed enough power to run the on-board electric equipment and user devices, as well as to power the main propulsion system, at least at the start-up stage.

This is currently achieved using so-called reversible electric machines, i.e. which operate as a generator when powered by the main propulsion system, and as an electric motor when powered by auxiliary electric power devices.

Currently used electric machines, which are normally variable-frequency alternating-voltage types, are still conceived as "independent units or modules", and are usually installed outside a gear housing, in which one or more gear transmissions are housed inside a fixed casing. The gear housing is normally connected to the main propulsion system by one or more transmission shafts and one or more gear transmissions, also assembled inside fixed casings.

The electric machine has its own input/output shaft connected to an input/output shaft of the gear housing and fitted with the electric machine rotor, the stator of which is connected to a dedicated supporting frame of the electric machine.

The location of the electric machine with respect to the gear housing allows maintenance and replacement of the electric machine, even with the propulsion system assembled on the aircraft.

Modern aircraft need increasingly more electric power to cater to the increase in sophisticated on-board actuating and control systems, as well as to power electric equipment now replacing traditional hydraulic and/or pneumatic equipment.

The increase in electric power demand means an increase in the size and weight of the electric machine and therefore of the gear housing as a whole, thus making it difficult to accommodate the electric machine/mechanical transmission assembly in the existing space in the propulsion or power generating systems.

SUMMARY OF THE INVENTION

It is an object of the present invention to provide an aircraft power generating assembly designed to provide a simple, low-cost solution to the above problems, and which in particular has significant size and weight advantages with respect to known solutions.

According to the present invention, there is provided an aircraft power generating assembly; the assembly comprising an electric machine, and a mechanical gear transmission connected to said electric machine; the mechanical gear transmission comprising a fixed supporting frame, at least one rotary shaft connected to the supporting frame to rotate about a fixed hinge axis, and first and second angular connecting means for connecting said rotary shaft to respective further rotary input/output shafts; and the assembly being characterized in that said electric machine is located between said first and second angular connecting means, surrounds said rotary shaft, and is connected angularly to said rotary shaft.

The electric machine of the above-defined assembly preferably comprises a hollow rotor fitted to said rotary shaft.

Alternatively, said electric machine comprises a hollow rotor surrounding said rotary shaft and fitted to said fixed supporting frame.

BRIEF DESCRIPTION OF THE DRAWINGS

A number of non-limiting embodiments of the invention will be described by way of example with reference to the accompanying drawings, in which:

FIGS. 3 and 4 are similar to and show variations of a detail in FIGS. 1 and 2 respectively.

DETAILED DESCRIPTION OF THE INVENTION

Figure 1:
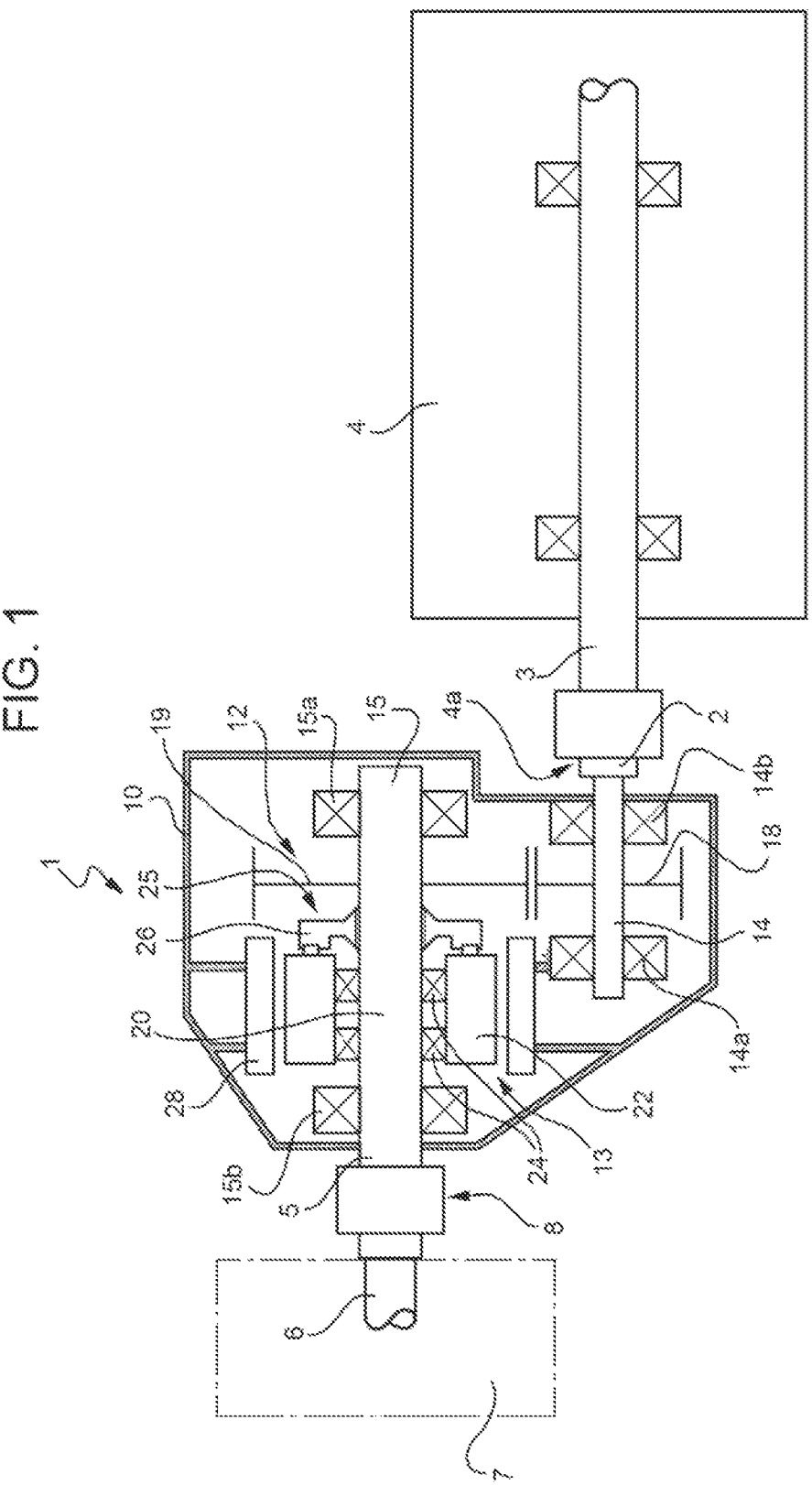
FIG. 1 shows a schematic, substantially block diagram of a preferred embodiment of the aircraft power generating assembly in accordance with the teachings of the present invention, and located between an engine and a propulsion system of the aircraft.

Number 1 in FIG. 1 indicates as a whole an assembly for generating electric or mechanical power on an aircraft (not shown).

Assembly 1 comprises a rotary shaft 2 connected in angularly fixed manner to a shaft 3 of an engine 4 of the aircraft by a known angular connecting device 4a not described in detail; and a rotary shaft 5 connected in angularly fixed manner to an input shaft 6 of a propulsion system 7 of the aircraft by a known angular connecting device 8 also not described in detail.

Assembly 1 comprises a supporting frame 10, which, in the example shown, defines a closed outer casing, from which only shafts 2 and 5 project; a mechanical gear transmission 12; and an electric power machine 13 associated with transmission 12 and convertible to operate both as an electric power generator and a drive motor.

In the example shown, mechanical transmission 12 comprises two shafts 14 and 15, which are connected to supporting frame 10 by respective end bearings 14a, 14b and 15a, 15b to rotate about respective fixed axes, are spaced transversely apart, and are parallel to each other and to shafts 2 and 5, of which they form respective extensions.

Shafts 14 and 15 are fitted—conveniently between respective bearings 14a, 14b and 15a, 15b—with respective gears 18 and 19 meshing directly as shown in FIG. 1, and which, together with shafts 2 and 14 and device 4a, connect shaft 15 in angularly fixed manner to shaft 3.

As shown in FIG. 1, machine 13—which is conveniently, though not necessarily, of the type described in the Applicant's international patent applications PCT/IB2009/050219 and PCT/IB2009/05214, incorporated herein by reference, coaxially surrounds an intermediate portion 20 of shaft 15 between bearings 15a and 15b, and comprises a rotor 22 with independent sectors insertable/extractable by simply sliding radially with respect to the axis of shaft 15, and lockable firmly with respect to one another.

Rotor 22 is fitted in rotary manner to portion 20 of shaft 15 with the interposition of two bearings 24, and is locked in angularly fixed manner to shaft 15 by a releasable coupling device 25. This comprises an angular locking member 26 fitted in angularly fixed manner to shaft 15, and which slides to and from rotor 22 along the axis of shaft 15, between a forward position (FIG. 1) fitting rotor 22 to shaft 15, and a withdrawn release position, in which rotor 22 and shaft 15 rotate freely with respect to each other to set machine 13 to idle or safety mode.

As shown in FIG. 1, machine 13 comprises a stator 28, also with independent sectors like rotor 22, and fitted firmly to frame 10, coaxially with shaft 15.

In the FIG. 3 variation, rotor 22 is fitted to a frame 22a of its own, which loosely surrounds portion 20 of shaft 15 and is connected to fixed frame 10 with the interposition of two bearings 22b, 22c at opposite axial ends of rotor 22; and coupling device 25 is interposed between shaft 15 and frame 22a.

Figure 2:
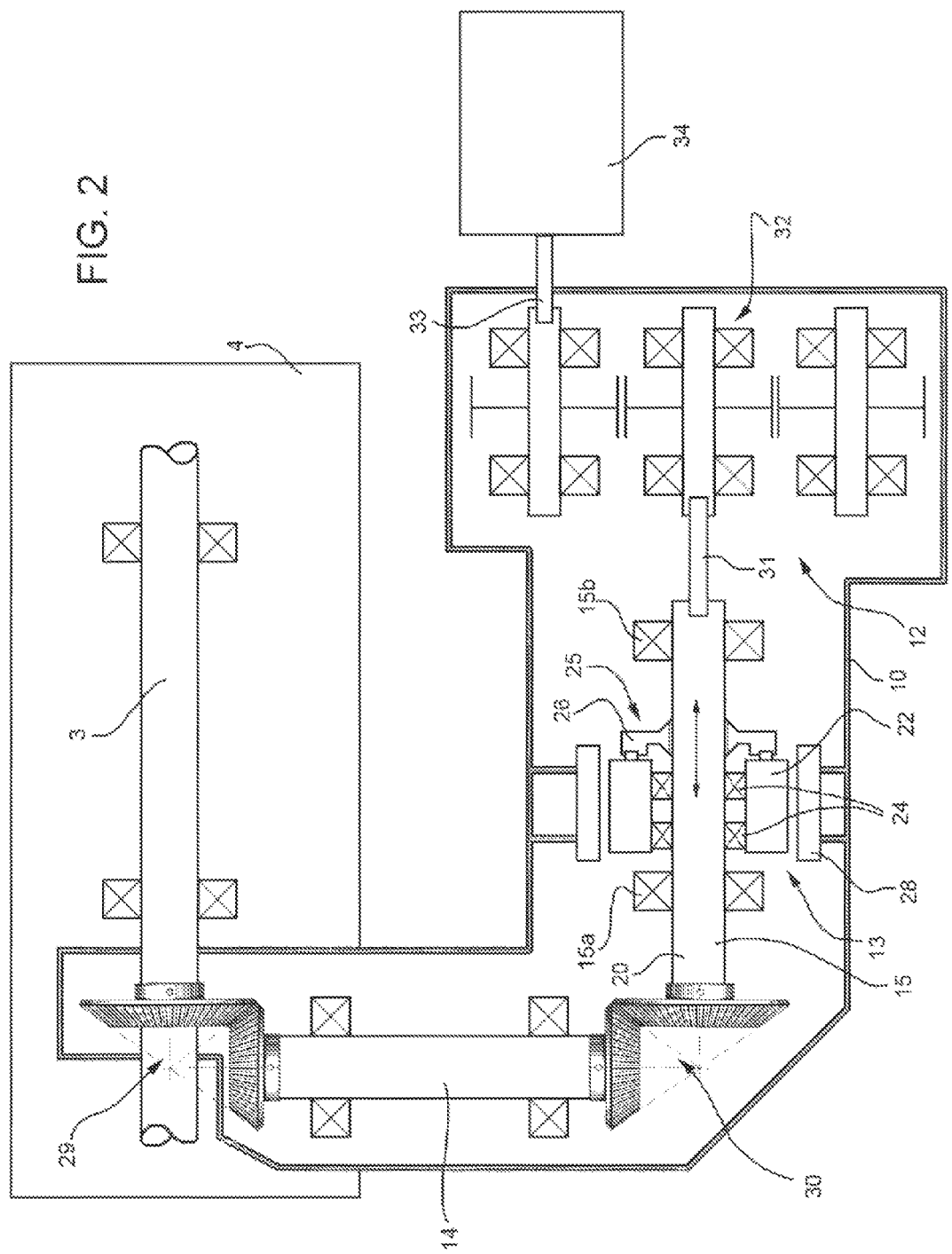
FIG. 2 shows a schematic, substantially block diagram of a variation of a number of details in FIG. 1.

In the FIG. 2 solution, shaft 14 is perpendicular to shafts 3 and 15, and is connected to shafts 3 and 15 by respective bevel gear pairs 29 and 30; and shaft 15 is connected in known manner to a shaft 31 of a spur gear train 32 housed completely inside supporting frame 10 and having an output shaft 33, which projects from supporting frame 10 to connect shaft 15 angularly to at least one accessory device 34, e.g. the fuel pump, outside supporting frame 10. In another variation, gear train 32 comprises a number of output shafts 33 for respective accessory devices.

In the FIG. 4 variation, shaft 15 is shorter than in the FIG. 2 solution, the two bearings 15a and 15b are located adjacent to each other and to bevel gear pair 30, and shaft 15 is still connected in angularly fixed manner to shaft 31, which is longer than in the FIG. 2 solution and surrounded by electric machine 13. As in the FIG. 3 solution, rotor 22 is fitted to its own frame 22a, which loosely surrounds an intermediate portion of shaft 31 and is directly connected in rotary manner to fixed frame 10 with the interposition of two bearings 22b, 22c at opposite axial ends of rotor 22. In the FIG. 4 solution, bearings 22b, 22c are in turn fitted to an interface frame A connected, preferably releasably, to fixed frame 10; and coupling device 25 is interposed between shaft 31 and frame 22a.

Compared with known solutions, the design of assembly 1 described—in particular, integrating electric machine 13 in mechanical transmission 12 by positioning rotor 22 about a shaft of the mechanical transmission, and connecting the rotor in angularly fixed manner to the shaft—above all greatly reduces the size of the mechanical transmission/electric machine assembly, thus gaining at least the space formerly occupied by the electric machine and the gear housing portion connected to it.

That is, compared with known solutions, in which the electric machine is located "behind" mechanical transmission 12, the transmission described eliminates the gearing branch formerly provided specifically for the electric machine, thus saving at least one pair of gears and relative rolling bearings.

Unlike known solutions, when electric machine 13 is operated as a current generator, i.e. is powered by engine 4, the transmission components downstream from the electric machine in the power direction need no longer be designed to take into account the power drawn by the electric machine, which normally accounts for large part of the total power drawn by the accessories mounted on the transmission casing.

Compared with solutions in which the electric machine is located "outside or behind" the transmission, mounting electric machine 13 along a shaft of the transmission does not significantly impair maintenance and/or replacement of the electric machine, by employing couplings, such as axially-sliding flanged couplings, enabling lateral or axial removal of the electric machine, or by employing "independent sector" electric machines specially designed for easy assembly and removal.

Finally, the solution proposed can adopt the same safety measures commonly used in conventional solutions in the event of failure of the electric machine, e.g. a releasable device, which, when necessary, immediately isolates the electric machine to cut off electric power generation without having to turn off the propulsion or power generating system.

Clearly, changes may be made to assembly 1 as described herein. In particular, the construction design of electric machine 13 may differ from that described by way of example; power pickup from shaft 3 may differ; and, in this connection, the mechanical transmission may obviously be connected to a secondary transmission shaft, as opposed to directly to shaft 3.

Gear train 32 may also differ from the one described, and comprise, for example, a different number of shafts in the same or different positions from those shown by way of example.

The invention claimed is:

1. An aircraft power generating assembly comprising an electric machine, and a mechanical gear transmission connected to said electric machine; the mechanical gear transmission comprising a fixed supporting frame, at least one rotary shaft connected to the fixed supporting frame to rotate about a fixed axis, and first and second connector assemblies rotating with and connecting said at least one rotary shaft to respective further rotary input/output shafts; wherein said electric machine is located between said first and second connector assemblies, surrounds said at least one rotary shaft, and is releasably connectable to said at least one rotary shaft by a releasable coupling movable axially along said at least one rotary shaft between connected and released positions.

2. The aircraft power generating assembly as claimed in claim 1, wherein said electric machine comprises a hollow rotor fitted to said at least one rotary shaft.

3. The aircraft power generating assembly as claimed in claim 2, wherein said rotor loosely surrounds said at least on rotary shaft; and a bearing assembly is interposed directly between said rotor and said at least one rotary shaft.

4. The aircraft power generating assembly as claimed in claim 2, wherein the releasable coupling is releasably interposed as a direct drive element between said hollow rotor and said at least one rotary shaft.

5. The aircraft power generating assembly as claimed in claim 1, wherein said electric machine comprises a hollow rotor surrounding said at least one rotary shaft and fitted to said fixed supporting frame.

6. The aircraft power generating assembly as claimed in claim 2, wherein said hollow rotor surrounds said at least one rotary shaft, and further includes a separate supporting structure; an additional bearing assembly being interposed between said separate supporting structure and said fixed supporting frame.

7. The aircraft power generating assembly as claimed in claim 6, further comprising an interface frame interposed between said fixed supporting frame and said additional bearing assembly.

8. The aircraft power generating assembly as claimed in claim 7, wherein the releasable coupling is interposed between said fixed supporting frame and said interface frame.

9. The aircraft power generating assembly as claimed in claim 7, wherein the releasable coupling is interposed as a direct drive element between said at least one rotary shaft and said separate supporting structure.

10. The aircraft power generating assembly as claimed in claim 1, wherein said electric machine comprises a stator connected to said fixed supporting frame.

11. The aircraft power generating assembly as claimed in claim 10, wherein said fixed supporting frame defines a closed outer casing; and said at least one rotary shaft, said stator, and said rotor are housed in said closed outer casing.

12. The aircraft power generating assembly as claimed in claim 1, wherein said second connector assembly connects said at least one rotary shaft directly to a shaft of a propulsion system of the aircraft.

13. The aircraft power generating assembly as claimed in claim 1, wherein said second connector assembly connects said at least one rotary shaft to at least one accessory device of the aircraft.

14. The aircraft power generating assembly as claimed in claim 1, wherein the electric machine is convertible to operate both as an electric power generator and as a drive motor.

15. An aircraft power generating assembly comprising an electric machine, and a mechanical gear transmission connected to said electric machine; the mechanical gear transmission comprising a fixed supporting frame, at least one rotary shaft connected to the fixed supporting frame to rotate about a fixed axis, and first and second connector assemblies rotating with and connecting said at least one rotary shaft to respective further rotary input/output shafts; wherein said electric machine is located between said first and second connector assemblies, surrounds said at least one rotary shaft, and is releasably connectable to said at least one rotary shaft, said electric machine comprises a hollow rotor fitted to said at least one rotary shaft, and said hollow rotor surrounds said at least one rotary shaft, and further includes a separate supporting structure with an additional bearing assembly being interposed between said separate supporting structure and said fixed supporting frame.

16. The aircraft power generating assembly as claimed in claim 15, further comprising an interface frame interposed between said fixed supporting frame and said additional bearing assembly.

17. The aircraft power generating assembly as claimed in claim 16, further comprising a releasable connector interposed between said fixed supporting frame and said interface frame.

18. The aircraft power generating assembly as claimed in claim 17, further comprising a releasable connector interposed as a direct drive element between said at least one rotary shaft and said separate supporting structure.

* * * * *